Patented Feb. 24, 1942

2,274,447

UNITED STATES PATENT OFFICE 2,274,447

CATALYTIC CONVERSION OF UREA-FORMALDEHYDE RESINS

Theodore S. Hodgins, Royal Oak, and Almon G. Hovey, Birmingham, Mich., assignors to Reichhold Chemicals, Inc., Detroit, Mich.

No Drawing. Original application September 13, 1939, Serial No. 294,750. Divided and this application February 17, 1940, Serial No. 319,540

10 Claims. (Cl. 260—71)

The invention relates to the conversion of urea-formaldehyde and other convertible resins by the use of a special acidic catalyst or latent accelerator. The present application is a division of our application Serial No. 294,750 filed Sept. 13, 1939.

Urea-formaldehyde resins as coating compositions have been known essentially as polymerizing resins rather than oxidizing resins, and for such purposes, hitherto the conversion has required heat. However, there are many materials, such as paper, wood, leather, rubber, etc., which do not stand the use of heat to such coating compositions on account of drastic decomposition which is likely. We have found that by the introduction of special acidic catalysts, these urea-formaldehyde resins, particularly those of the urea-formaldehyde-monohydric alcohol type which are so successfully used for coatings and which are of the type disclosed in our companion applications Serial Nos. 203,149, filed April 20, 1938 now issued as U. S. Patent No. 2,221,708; 234,022 filed October 8, 1938, now issued as U. S. Patent No. 2,168,477, dated August 8, 1939; 147,568 filed June 10, 1937, now issued as U. S. Patent No. 2,109,291 dated February 22, 1938; 237,578 filed October 28, 1938, now issued as U. S. Patent No. 2,226,518; 239,878 filed November 10, 1938, now issued as U. S. Patent No. 2,187,081; 247,988 filed December 27, 1938, now issued as U. S. Patent No. 2,261,084; 268,782 filed April 19, 1939, now issued as U. S. Patent No. 2,222,506; 270,864 filed April 29, 1939, now issued as U. S. Patent No. 2,215,038; 280,388 filed June 21, 1939, now issued as U. S. Patent No. 2,233,320; and 286,729 filed July 26, 1939, now issued as U. S. Patent No. 2,227,223, may be converted in a relatively short time at substantially room temperature. In all these applications, urea-formaldehyde resins are described which can use catalysts of the type which we are about to describe for greater usefulness in converting the films without the application of heat or, at least, with a very low bake as compared to the extremely high bake which has been hithertofore necessary for complete conversion. Besides urea-formaldehyde resins, those which are prepared from dimethylolurea and acetals of monohydric alcohols are also very much improved by the use of these catalysts in lowering the baking temperature or in air-drying work.

The advantages of the use of these catalysts are readily apparent. Films which would remain as tacky as flypaper and which are still poor in water-resistance may be converted to clear, transparent, glossy, hard, glass-like finishes which may be applied on paper, wood, leather, artificial leather, rubber, and other materials. On wood, the finishes may be ready for sanding within 4 hours if necessary, the films being as hard as lacquer and yet very much more fire-resistant. The use of these catalysts, therefore, opens up fields for air-drying urea-formaldehyde resins, for dimethylol-urea-acetal resins, for urea-formaldehyde-monohydric alcohol resins, for urea-phenol formaldehyde resins, etc., which have never before been anticipated.

We are aware of the use of acidic catalysts or those of an inorganic nature such as zinc chloride, hydrochloric acid, sulphuric acid, nitric acid, aluminum chloride, iron chloride, and the like. The use of such catalysts, however, produces marked instability of the product upon storage. Stability of the vehicle is the prime necessity for the use not only of these accelerators in air-drying "shelf goods," but is also a very desirable characteristic for industrial work. There is nothing so disagreeable as treacherous stability because one never knows the life of the product.

This question of lack of stability is a stumbling block on many commercial applications. As a typical example of this, we quote from the patent of Battye, Marsh, Tankard, Watson, and Wood, U. S. Patent 2,088,227 (July 27, 1937) page 1, line 50 to the bottom of the page, and page 2, lines 1-20 inclusive. In Example 1 of that patent a urea-formaldehyde solution of great commercial possibilities is rendered relatively useless by the fact that it is stable only for about 5 hours at 15-16° C.

In our U. S. application Serial No. 234,022, filed October 8, 1938, and issued as U. S. Patent 2,168,477, dated August 8, 1939, we have disclosed the use of phosphoric acid as a catilyzer or accelerator for the conversion of the stable urea - formaldehyde - ethylene glycol condensation product. The use of this phosphoric acid catalyst constituted a great improvement over Serial No. 203,148 filed April 20, 1938, now Patent No. 2,185,167 dated Dec. 26, 1939, because with this catalyst we obtained a better conversion in 5 minutes at 190° F. than we did in 5 minutes at 250° F. without it. Our present invention however, constitutes a still further improvement over this disclosure in Serial No. 234,022 now Patent No. 2,168,477 dated Aug. 8, 1939. Our new catalysts are partly organic and partly inorganic, the inorganic portion consisting of radicals obtained from the use of phosphoric anhydride ($P_2O_5$), the organic parts consisting of organic radicals derived from organic alcohols of the general formula ROH. The use of appropriate catalysts for the particular urea-formaldehyde resin solution in question, as we are about to describe, constitutes a great improvement in stability through choice of the radicals used. For example, for a water-soluble resin, a typical example is the phosphoric esters (mono and/or di) of ethylene glycol or other polyhydric alcohols which have incidental water-solubility. Catalysts may be prepared in a similar way which are admirable for use in the so-called solvent type of urea-formaldehyde resins, i. e., resins such as those described in our Serial Nos. 239,878; 268,782 and 286,729 of which a urea-formaldehyde-butanol condensation product is a typical example. Catalysts which may be used with the solvent type are, for example, those derived from (mono or di) phosphoric esters of fatty alcohols or of castor oil, which are complex monohydric alcohol-like bodies. It will thus be seen that these catalysts are generic to the basic reaction of $P_2O_5+ROH$, the nature of the alcohol determining the nature of the catalyst, and influences the operativeness of the resulting catalyst for the type of resin in which it is to be used, i. e., whether hydrophobic or hydrophillic in nature.

Our process, the preparation of acidic catalysts, is not to be confused with the preparation of neutral esters of phosphoric acid, for example Bannister's U. S. Patent 1,799,349 issued April 7, 1931, that is, trialkyl phosphate. We are interested only in the mono- or dialkyl phosphates, i. e. those which have capacity for liberating hydrogen-ions. Furthermore, it does not have to be a pure compound, that is, neither the mono- or di-, but may be a mixture of them and still be very effective. Even slight amounts of trialkyl (completely saturated) phosphate may not be detrimental. The formation of the accelerators may be described by the general reaction:

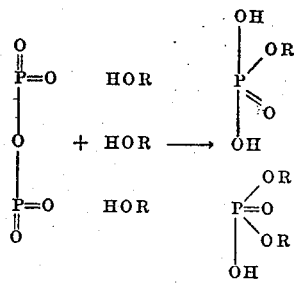

For catalyzing the water-soluble urea-formaldehyde type, mono- and di-phosphoric esters and/or their mixtures of the following alcohols may be employed: glycerol, ethylene glycol, propylene glycol, butylene glycol, sorbitol, mannitol, trimethylene glycol, dextrose and other polyhydroxy compounds. Starch and even cellulose may also be used as catalytic material when esterified to a partial extent with phosphoric anhydride. Short, straight chain alcohols, such as methyl alcohol and ethyl alcohol, are capable of forming water-soluble mono- and di-phosphates which are useful in the water-soluble type when they are not completely esterified. When they are completely neutralized, of course, their catalytic effect is practically nil and their action becomes that of a water-soluble plasticizer which is really the reverse of the action of our accelerators.

Catalysts which are very effective for the solvent type urea-formaldehyde resins are prepared by reacting phosphoric anhydride in such proportions as to form the mono- and/or di-esters with alcohols of carbon atom chain length of 3 or greater, such as propyl, butyl, amyl, octyl alcohol, lauryl alcohol, and others in the series. Other substances which have free hydroxyl groups and which may be considered as being effectively complex alcohols may be employed. Among these are: castor oil which has one free hydroxyl group per each fatty acid radical or three hydroxyl groups per mol of oil, also the monoalkyl ethers of ethylene glycol and of other polyhydric alcohols. The complex polyhydric alcohol-like body which was described in our Serial No. 147,568 (now U. S. Patent 2,109,291) may also be reacted with $P_2O_5$ to form a complex accelerator.

As specific examples of our invention, we quote the following:

*Example 1*

14.3 grams of $P_2O_5$ is wet with 10 grams of mineral spirits (boiling range 300-400° F.) and 10 grams of butyl cellosolve (the monobutyl ether of ethylene glycol). The catalyst is prepared by slowly adding the $P_2O_5$ which previously has been moistened with the solvent to 85.7 grams of castor oil. The temperature of reaction should be between 25-50° C. if a light-colored product is to result. The process is carried out in a stainless steel doughmixer of the Werner and Pfleiderer type and usually requires 6-8 hours to give a product 83.4% non-volatile. The product is highly viscous, and therefore, the product cannot be prepared by ordinary agitation; it requires equipment strong enough to turn a very viscous material, having an absolute viscosity approaching 200 poises at 25° C. in the final stages. On account of the high viscosity, it is generally reduced to 50% non-volatile with solvent, butanol, anhydrous alcohol, monobutyl ether of ethylene glycol, aromatic hydrocarbons and aliphatic hydrocarbons. This particular product, when thinned to 50.0% non-volatile, can be identified by a $P_2O_5$ content of 7.15% by weight. The viscosity at 50% non-volatile in denatured alcohol is of the order of 4-5 poises at 25° C. and resembles a light-colored resinous product in appearance or a light sticky syrup.

5-10 grams of the above accelerator added to 100 grams of a urea-formaldehyde-butanol condensation product (60% solution in butanol) will produce an air-drying urea-formaldehyde resin film which will air-dry in 2-4 hours ready to sand. Without this accelerator, the same urea-formaldehyde solution applied under the same conditions takes 2-3 days to air-dry.

The stability of the urea-formaldehyde resin solution containing the accelerator is 3-6 months at room temperature in contrast to the same resin to which an addition of an inorganic acid catalyst dissolved in alcohol, such HCl, is stable for only a few hours.

*Example 2*

2,380 grams of castor oil, 230 grams of mineral spirits (petroleum solvent with boiling range of 300-400° F.) and 340 grams of $P_2O_5$ mixed with 450 grams of mineral spirits were reacted as in Example 1 and then the following mixed solvent was added:

| | Grams |
|---|---|
| Mineral spirits | 270 |
| Butyl alcohol (normal) | 170 |
| Anhydrous alcohol | 340 |

Yield=4,179 grams at 65.0% non-volatile of a very light straw colored, sticky, viscous liquid with a viscosity of approximately 10 poises.

5 parts of the above catalyst added to 120 parts by weight of a urea-formaldehyde-butanol condensation product (60% non-volatile in an equal mixture of butanol and anhydrous alcohol) makes a very satisfactory air-drying urea resin finish which dries in 1½–2 hours to a tack free, firm condition and can be sanded in 3–4 hours. These films were cast at .003 of an inch and allowed to dry at approximately 25° C. Without the catalyst, the drying time was 2–3 days. The stability of this catalyzed urea-formaldehyde resin was between 3 and 6 months as extreme, averaging 5 months at room temperature storage as compared to a matter of only a few hours if an inorganic catalyst such HCl was added in alcoholic medium.

Example 3

An accelerator was prepared by wetting 3280 grams of $P_2O_5$ with 300 grams of mineral spirits and 300 grams of cello-solve (as in Example 1) and then reacting with 3300 grams of octyl alcohol over a period of 6–8 hours at 25–50° C. in a Werner and Pfleiderer doughmixer made of stainless steel. This accelerator was thinned with a mixture of equal parts by weight of toluol and butanol to 50% non-volatile content and formed an oil, sticky, viscous solution. When added to a urea-formaldehyde resin in the proportion of 5 parts to 100 of a 60% non-volatile content solution of a urea-formaldehyde-butanol resin, the film cast at .004 of an inch dried tack free in 2–3 hours at room temperature and could be sanded at the end of 4 hours, whereas, the same film without catalyst required 2–3 days.

The solution containing this catalyst was stable for 4 months on room temperature storage, whereas, the same solution, catalyzed to the same drying rate by an inorganic accelerator such as HCl dissolved in alcohol, had a stability limited to that of a few hours.

Example 4

2000 grams of $P_2O_5$ were wet with 2500 grams of toluol and added to a mixture consisting of Diolin (1,9 octadecanediol), 2000 grams; toluol, 2500 grams; butanol, 1400 grams. The reaction takes place in a Werner and Pfleiderer stainless steel doughmixer in 6–8 hours at 25–50° C. as in Example 1. Toward the end of the reaction, this product is a very thick mass, stirring with difficulty in the doughmixer and having a viscosity of about 200 poises at 25° C. The material was thinned to 50% non-volatile with the addition of 600 grams more of butanol and 1000 grams of anhydrous ethyl alcohol. The result is a medium viscosity liquid of approximately 4–6 poises which is miscible with a urea-formaldehyde-butanol resin and similar resins.

This catalyst is especially adaptable to urea-phenol-formaldehyde resins such as the following:

| | Grams |
|---|---|
| Bis-phenol | 40 |
| Aqueous 37% formaldehyde | 140 |
| Potassium hydroxide | 4 |
| Water | 4 |

These are aged over night 15 hours at 30° C. with agitation and thermostatic control. At the end of this period, 400 grams of aqueous 37% formaldehyde and 160 grams of urea are added. These are aged at 50° C. and held for 4 hours. At the end of this period, a mixture of 4.58 grams of ortho-phosphoric acid and an equal amount of water are added. The mixture is then distilled for 4 hours at 60–65° C. or until 350 grams of distillate (water) are removed. At this stage, 500 grams of anhydrous alcohol mixed with 4.6 grams of 75% ortho-phosphoric acid are added and the whole batch stirred. The yield is 908 grams.

To 100 grams of the above resin solution are added 5–6 grams of the catalyst described in this example. A very stable catalyzed solution results and the films, while not so transparent and water-white as those of the straight urea-formaldehyde resins containing no phenol, are nevertheless, very desirable because they air-dry very hard in 1 hour, and in the film thickness in which they are applied, they appear to be practically water-white. They can can sanded in 2 hours and a second finish then applied if necessary.

Example 5

3280 grams of $P_2O_5$ are wet with 400 grams of butanol and added to 2760 grams of ethylene glycol and reacted as in Example 1. In this case, however, the resulting product is water-soluble and when thinned down to 50% non-volatile with water, has a rather low viscosity (not greater than 2 poises) and is water-white and admirable for use with water-soluble, water-white, heat-convertible resinous products such as the urea-formaldehyde-ethylene glycol products described by us in U. S. Patent 2,168,477.

We usually prefer to add 1–5 parts per thousand of catalyst to the 40% solution of the resin in water, thus producing very stable solutions which are much better on stability than those described in U. S. Patent 2,168,477 which use only phosphoric acid as a catalyst. The films cast on the resin solutions using this catalyst can be rapidly air-dried in less than 1 hour and baked in thin films in a shorter time at 30 seconds at 300 F. on light weight cloth, paper and the like, said films being water-white and very resistant to discoloration, on either air-drying or baking, the grease-resistance also being a very desirable characteristic. Fields in which water-soluble resins of this type are of value are in grease-resistant paper size, increasing the wet strength of paper, grease-proofing fabrics, stiffening fabrics, molding and laminating work, particularly in face sheets as well as dark colored filler sheets, and in its higher viscosity modification, such catalyzed resins may be used as pigment carriers for printing on fabric and paper and also have value in increasing the water-resistance of water-soluble cellulose derivatives such as methyl cellulose and other water-soluble cellulose ethers, polyvinyl alcohols, and the like.

While the foregoing specific examples are directed particularly to the preparation of coating compositions, the invention in its broadest aspects contemplates the use of the new catalysts in preparation of resins to be employed in molding and laminating work in which field rapid speed of conversion is of utmost importance.

We claim:

1. A process for converting an acid convertible urea-formaldehyde resin which comprises adding to the resin a preformed accelerator, comprising an acid alkyl phosphate containing solely phosphoric and alkyl radicals, wherein the alkyl radical has a carbon chain length of at least 3.

2. A process for converting an acid convertible urea-formaldehyde resin which comprises adding to the resin a preformed accelerator comprising a mixture of mono- and dialkyl phosphate containing solely phosphoric and alkyl radicals, wherein the alkyl radical has a carbon chain length of at least 3.

3. A process for converting an acid convertible urea-formaldehyde resin, which comprises adding to the resin a preformed accelerator comprising an acid ester containing solely phosphoric and hydrocarbon radicals.

4. A process as set forth in claim 3 wherein the accelerator is added to a cold resin.

5. A process as set forth in claim 3 wherein the resin to be treated is dissolved in an organic solvent.

6. A process as set forth in claim 3 wherein the resin treated is a urea-formaldehyde-monohydric alcohol resin.

7. A process as set forth in claim 3 wherein the resin treated is a urea-formaldehyde-butanol condensation product.

8. A composition comprising a cold acid setting urea-formaldehyde resin and a preformed accelerator comprising an acid ester containing solely phosphoric and hydrocarbon radicals.

9. A coating composition comprising a cold solution of an acid setting urea-formaldehyde resin in an organic solvent, and a preformed accelerator comprising an acid ester containing solely phosphoric and hydrocarbon radicals.

10. A coating composition capable of forming an air-drying film, comprising a urea-formaldehyde resinous condensation product dissolved in an organic solvent, and a preformed latent accelerator comprising an acid ester containing solely phosphoric and hydrocarbon radicals.

THEODORE S. HODGINS.
ALMON G. HOVEY.